United States Patent
Shin et al.

(12) 
(10) Patent No.: US 6,228,515 B1
(45) Date of Patent: May 8, 2001

(54) UNDERLAYER FOR USE IN A HIGH DENSITY MAGNETIC RECORDING MEDIA

(75) Inventors: Kyung-Ho Shin; Taek-Dong Lee; Soo-Youl Hong, all of Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/175,475

(22) Filed: Oct. 20, 1998

(30) Foreign Application Priority Data

Feb. 17, 1998 (KR) ................................... 98-4740
Apr. 18, 1998 (KR) ................................... 98-13933

(51) Int. Cl.[7] ............................................. G11B 5/64
(52) U.S. Cl. ........................... 428/694 TS; 428/694 TM
(58) Field of Search ................ 428/694 TS, 694 TM, 428/900

(56) References Cited

U.S. PATENT DOCUMENTS 5,693,426 * 12/1997 Lee et al. .............................. 428/611
5,800,931 * 9/1998 Lee et al. .............................. 428/611
5,858,566 * 1/1999 Zhang .............................. 428/694 TS
5,993,956 * 11/1999 Lambeth et al. ....................... 428/332

* cited by examiner

Primary Examiner—Deborah Jones
Assistant Examiner—Bryant Young
(74) Attorney, Agent, or Firm—Oblon, Spivak, McClelland, Maier & Neustadt, P.C.

(57) ABSTRACT

The present invention relates to an underlayer for use in a high density magnetic recording media. More particularly, the invention relates to an underlayer for use in a high density magnetic recording media comprising AlPd or CoTi intermetallic compound having B2 crystal structure, or $Co_{50}Ti_{50-x}M_x$ metal alloy in which Ti in CoTi intermetallic compound is partly substituted by other substitutional elements while maintaining its B2 crystal structure, or CoTi/Cr of a double thin film structure in which a Cr seed layer is introduced.

The underlayer provided by the present invention has a crystal structure and microstructure suitable for a high density magnetic recording media, which makes a good texture structure with a Co-based magnetic layer deposited thereon and shows fine grain size distribution, high coercity and high coercity squareness.

1 Claim, 4 Drawing Sheets

CoCrPt(300 Å)Cr(700 Å)/glass

CoCrPt(300 Å)CoTi(700 Å)/glass

Cross sectional TEM bright field image
of CoCrPt(300 Å)/CoTi(300 Å)/Cr(500 Å).

UNDERLAYER FOR USE IN A HIGH DENSITY MAGNETIC RECORDING MEDIA

BACKGROUND OF THE INVENTION

1. Field of the Invention

The present invention relates to an underlayer for use in a high density magnetic recording media. More particularly, the invention relates to an underlayer for use in a high density magnetic recording media comprising AlPd or CoTi intermetallic compound of B2 crystal structure, or $Co_{50}Ti_{50-x}M_x$ metal alloy in which Ti in CoTi intermetallic compound is partly substituted by other substitutional elements while maintaining its B2 crystal structure, or CoTi/Cr having a double thin film structure in which a Cr seed layer is introduced. The present underlayer has a crystal structure and microstructure suitable for a high density magnetic recording media so that it provides a good texture structure with a CoCr-based magnetic layer deposited thereon and shows fine grain size distribution, high coercity and high coercity squareness.

2. Description of the Prior Art

An information recording media of a computer hard disk drive uses a magnetic recording process and refers to a magnetic disk. The magnetic disk generally comprises a substrate, underlayer, magnetic layer and protective coating layer (FIG. 1). The magnetic layer uses a Co-based alloy thin film of HCP structure having high crystallographic anisotropy, and the magnetic property of its longitudinal direction can be improved by enhancing the crystallographic orientation property of the c-axis which is a magnetic easy axis or by fining a grain size of a thin film.

An underlayer deposited between the substrate and the magnetic layer increases an adherence of the magnetic thin film and acts as a template on the magnetic layer deposited thereon by which it makes possible to control the microstructure of the magnetic layer. An important role of the underlayer as the template is to grow its crystal surface in a preferred orientation so as to have a grain-to-grain epitaxial growth relationship with the crystal surface of the magnetic easy axis of the magnetic layer. To meet this requirements, many different underlayer materials such as Cr, Mo, W, Ti, NiP and Cr alloy with the other elements, for example CrV, CrTi, CrW, etc., have been researched (See, H. Susuki, N. Tsumita, M. Hayashi, Y. Matsuda, IEEE Trans. Magn., 26, 2280 (1990) and Rajiv Ranjan, J. Appl. Phys., 67 (9), 4698 (1990)).

Among these, the most successful underlayer material to be used is a Cr thin film having BCC structure which can grow heteroepitaxially with Co alloy magnetic thin film. The crystallographic orientation and grain size of the Cr underlayer is important for the control of those of Co alloys. However, grain size of Cr is relatively large unless it is deposited in ultra high vacuum, and strict crystallographic texture control is sometimes difficult.

Recently, a NiAl intermetallic compound underlayer having B2 crystal structure which has the similar lattice constant as that of Cr (2.884 Å) and can control the fine grain size has been proposed as an alternative for the Cr underlayer (See, L. L. Lee, D. E. Laughlin, and D. N. Lambeth, J. Appln. Phys., 79(8), 4902 (1996)). However, although the NiAl underlayer material can make the grain size finer because of the high binding energy property of an intermetallic compound, a higher temperature and a thicker thin film is required to form a crystalline thin film since the temperature necessary for forming its stable phase is high, about 1635° C. Also, when NiAl thin film is deposited directly on an amorphous substrate, only the NiAl (110) crystal plane grows so that it is impossible to make the magnetic easy axis of Co alloy magnetic thin film coated thereon grow in parallel on the surface of the substrate. To improve this, a seed layer such as MgO should be introduced into the NiAl underlayer. Therefore, the NiAl intermetallic compound has many factors to be improved in view of heteroepitaxial growth.

For this reason, skilled persons in the art have carried out research to develop a novel underlayer to supplement the above disadvantage and to obtain a magnetic layer having the magnetic property and microstructure suitable for a high density magnetic recording media.

Considering the problems derived from the above conventional underlayer material for a high density magnetic recording media, the present inventors investigated whether an AlPd or CoTi intermetallic compound having B2 crystal structure with a lattice constant of 2.987 Å which is expanded about 3.8% in comparison to a Cr underlayer having BCC structure, which is currently used as an underlayer of CoCrPt(Ta) magnetic thin film for the magnetic recording media, or a NiAl having B2 crystal structure proposed as an alternative for the Cr underlayer, or $Co_{50}Ti_{50-x}M_x$ metallic alloy in which Ti in CoTi intermetallic compound is partly substituted by other substitutional elements while maintaining its B2 crystal structure, can be used as underlayer material for a high density magnetic recording media. Further, they researched whether introduction of a Cr seed layer to the CoTi underlayer can improve crystallization of the underlayer.

From this research, the present inventors found that when said AlPd or CoTi intermetallic compound having B2 crystal structure, $Co_{50}Ti_{50-x}M_x$ metal alloy, or CoTi/Cr underlayer of a double thin film structure in which CoTi is coated on Cr seed layer is used as underlayer material, the underlayer provides a magnetic recording media having superior magnetic property and microstructure, makes a good texture structure with Co-based magnetic layer deposited thereon and shows fine grain size distribution, high coercity and high coercity squareness.

SUMMARY OF THE INVENTION

Figure 1:
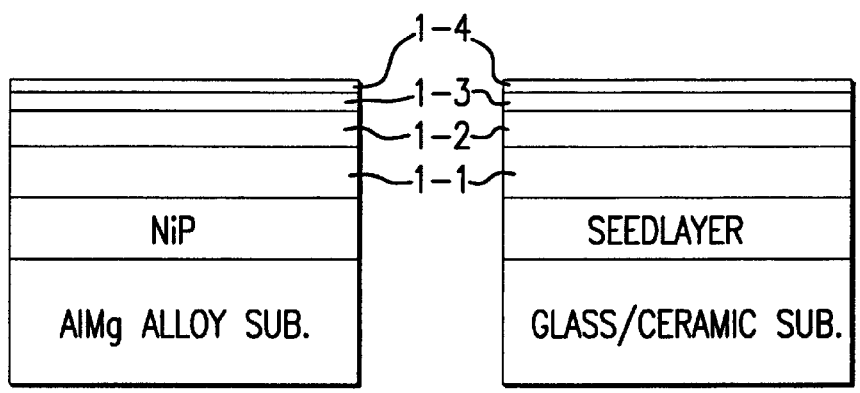
FIG. 1 is a cross sectional schematic view of a computer hard disk for magnetic recording to which the underlayer of the invention applies. 1-1 is an underlayer, 1-2 is a magnetic layer, 1-3 is a protective layer and 1-4 is a lubricant layer.

It is an object of the invention to provide an underlayer for use in a high density magnetic recording media comprising AlPd or CoTi intermetallic compound having B2 crystal structure.

It is a further object of the invention to provide an underlayer for use in a high density magnetic recording media comprising $Co_{50}Ti_{50-x}M_x$ metal alloy in which Ti in CoTi intermetallic compound is partly substituted by other substitutional elements with maintaining its B2 crystal structure.

It is a further object of the invention to provide a CoTi/Cr underlayer of a double thin film structure in which CoTi is coated on a Cr seed layer of 10 to 1000 Å thickness, which is disposed between a Co alloy magnetic thin film and substrate.

The underlayer according to the present invention, when used as underlayer material, provides the magnetic recording media having superior magnetic property and microstructure, makes a good texture structure with a Co-based magnetic layer deposited thereon and shows fine grain size distribution, high coercity and high coercity squareness. Thus, the underlayer of the invention can provide a high density magnetic recording media having superior magnetic properties compared to media which uses the conventional Cr underlayer.

DETAILED DESCRIPTION OF THE INVENTION

In accordance with the present invention, an underlayer comprising AlPd or CoTi intermetallic compound of B2 crystal structure for use in a high density magnetic recording media is provided.

Further, the present invention provides an underlayer comprising an alloy of formula (I) for a high density magnetic recording media in which Ti in CoTi intermetallic compound is partly substituted by other substitutional elements while maintaining its B2 crystal structure.

$$Co_{50}Ti_{50-x}M_x \qquad (I)$$

wherein,

M is at least one element selected from the group consisting of Mg, Al, Si, Ca, V, Cr, Mo, Cu, Zn, Ge, Zr, Mn, Ag, Sn, W, Ta, Nb and Pt, x is atom % with the range of $0 \leq x \leq 10$.

In the formula (I), the content of the additional element(s) is preferably not more than 10 atom %. If the content of the additional element(s) exceeds 10 atom %, it causes excessive expansion and contraction of the lattice constant of the underlayer by which the crystal structure of the underlayer is changed. As a result, the underlayer can not have B2 crystal structure.

Further, according to the present invention, a CoTi/Cr underlayer of a double thin film structure is provided in which CoTi is coated on Cr seed layer having 10 to 1000 Å thickness, which is disposed between a Co alloy magnetic thin film and substrate.

Cr thin film which is currently used as an underlayer of a high density magnetic recording media has BCC crystal structure, and the lattice constant of Cr is known to be 2.884 Å. In this connection, the inventors confirmed that said alloy thin films according to the present invention have the similar B2 crystal structure, lattice constant and uniform range as those of Cr thin film. For example, AlPd intermetallic compound thin film forms a B2 crystal structure up to its melting point of 1625° C. In bulk, the thin film has uniform range of B2 crystal structure when a composition of Pd is within 44 to 56 atom %, and has a lattice constant of 3.036 Å which is a little larger than that of Cr (2.884 Å). Also, CoTi intermetallic compound thin film forms a B2 crystal structure up to its relatively low melting point of 1325° C. In bulk, the thin film has uniform range of B2 crystal structure when a composition of Co is within 48 to 55 atom %, and has a lattice constant of 2.987Å which is a little larger than that of Cr.

The crystal structures and lattice constants of AlPd and CoTi thin film underlayers of the invention and Cr thin film underlayer as a comparative example are summarized in table 1.

TABLE 1

Crystal structures and lattice constants of selected underlayers.

|  | Cr | AlPd | CoTi |
| --- | --- | --- | --- |
| Crystal structure | BCC | B2 | B2 |
| Lattice constant | 2.884 Å | 3.036 Å | 2.987 Å |
| Normalized [a] | 1 | 1.053 | 1.035 |

Cr underlayer has a grain-to-grain epitaxial growth relationship with the Co-based magnetic thin film. AlPd and CoTi intermetallic compounds also have the similar epitaxial relationship with the Co-based magnetic thin film. Also, AlPd and CoTi intermetallic compounds form a highly stable B2 crystal phase because of strong bonding between Al and Pd atoms, and Co and Ti atoms, respectively. This implies low atomic mobility which in turn can refrain a growth of grain and yield relatively small grain size. By virtue of these characteristics, AlPd and CoTi intermetallic compounds can be utilized as an underlayer material of Co-based magnetic thin film. It is expected that they show superior matching of crystal lattice constants when used as the underlayer of Pt-substituted Co-based alloy magnetic thin film having the expanded lattice constant which is promising as material for a high density magnetic recording media.

In addition, the melting point of CoTi intermetallic compound is about 1325 ° C. which is lower than that of NiAl or AlPd. This difference makes the CoTi intermetallic compound more advantageous in that CoTi compound can be deposited in a form of crystal thin film at a lower temperature and in a thinner thickness.

In an underlayer material of $Co_{50}Ti_{50-x}M_x$ metal alloy, the magnetic property can be improved by progress of enhancement of lattice matching due to lattice constant expansion of the underlayer and atomic diffusion from the underlayer to the magnetic layer.

$Co_{50}Ti_{50-x}M_x$ alloy underlayer in which Ti in CoTi intermetallic compound is partly substituted by other elements while maintaining its B2 crystal structure, and a CoTi/Cr underlayer of a double thin film structure in which CoTi is coated on Cr seed layer also have paramagnetic phase as B2 crystal structure.

Figure 3A:
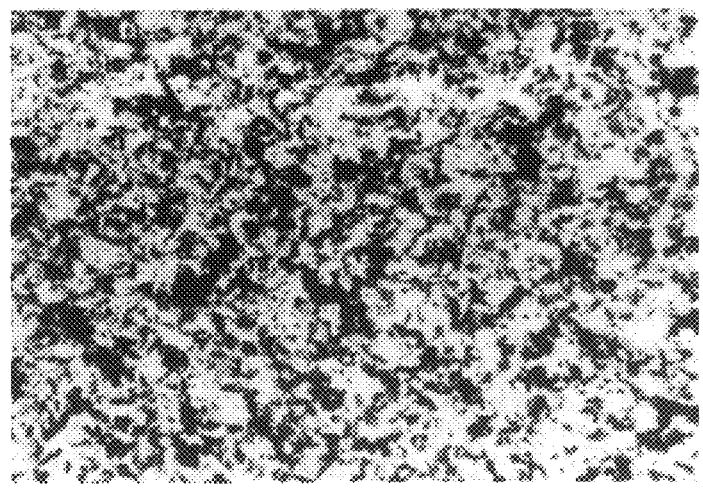
FIG. 3 shows Transmission Electron Microscopy (TEM) photographs of magnetic thin films of CoCrPt/CoTi/glass and CoCrPt/Cr/glass which are prepared by forming CoTi underlayer of the invention and Cr underlayer as a comparative example on glass substrate, respectively, and depositing CoCrPt magnetic thin film thereon at about 280° C.
Figure 3B:
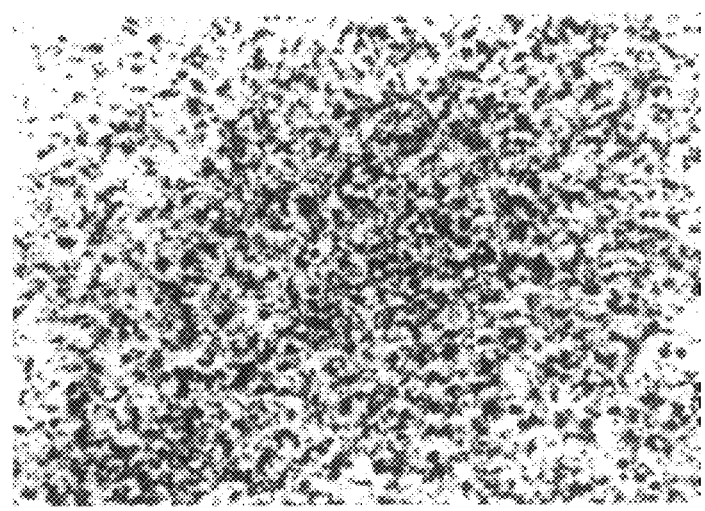

Thus, the underlayer of the instant invention has the paramagnetic phase of B2 crystal structure which makes a good epitaxial relationship with Co-based alloy magnetic layer deposited thereon, for example CoCrTa, CoCrPt and CoCrPtTa, and shows fine grain size distribution, high coercity and high coercity squareness as indicated in Table 2 of Example 1 and FIG. 3.

Figure 2:
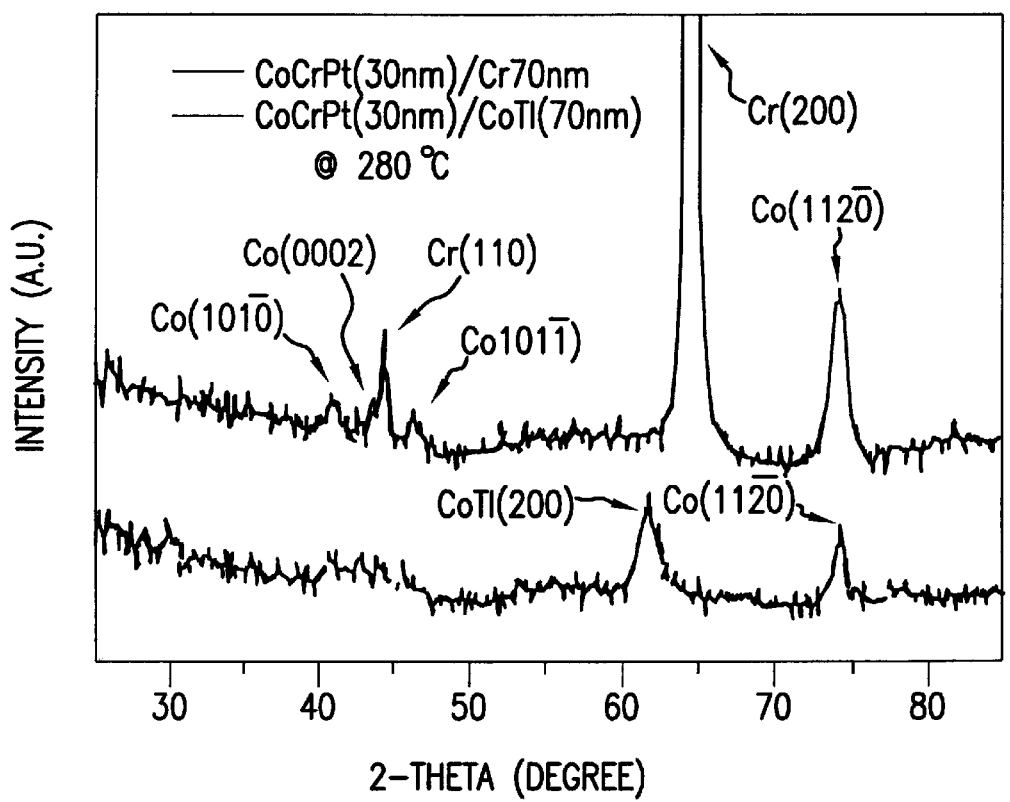
FIG. 2 shows X-ray diffraction patterns of CoCrPt/CoTi/glass and CoCrPt/Cr/glass which are prepared by forming CoTi underlayer of the invention and Cr underlayer as a comparative example on glass substrate, respectively, and depositing CoCrPt magnetic thin film thereon at about 280° C.

FIG. 2 shows X-ray diffraction patterns of CoCrPt/CoTi/glass and CoCrPt/Cr/glass which are prepared by forming a CoTi thin film underlayer of the invention and a Cr thin film underlayer as a comparative example on glass substrate, respectively, and depositing CoCrPt magnetic thin film thereon at about 280° C.

As shown in FIG. 2, in X-ray diffraction patterns of CoCrPt/Cr/glass, the (0002) plane peak of the magnetic layer overlaps the (110) plane peak of the underlayer. However, in X-ray diffraction patterns of CoCrPt/CoTi/glass, the (0002) plane peak of the magnetic layer does not appear. Thus, it can be noted that the CoTi underlayer of the invention is suitable for a high density magnetic recording media.

FIG. 3 shows Transmission Electron Microscopy (TEM) photographs of magnetic thin films of CoCrPt/CoTi/glass and CoCrPt/Cr/glass which are prepared by forming a CoTi underlayer of the invention and a Cr underlayer as a comparative example on glass substrate, respectively, and depositing CoCrPt magnetic thin film thereon at about 280° C.

As shown in FIG. 3, the grain size of the magnetic layer deposited on the CoTi underlayer of the present invention is about 200 Å which is much finer than the grain size (about 400 Å) of the magnetic layer deposited on the Cr underlayer.

Figure 4:
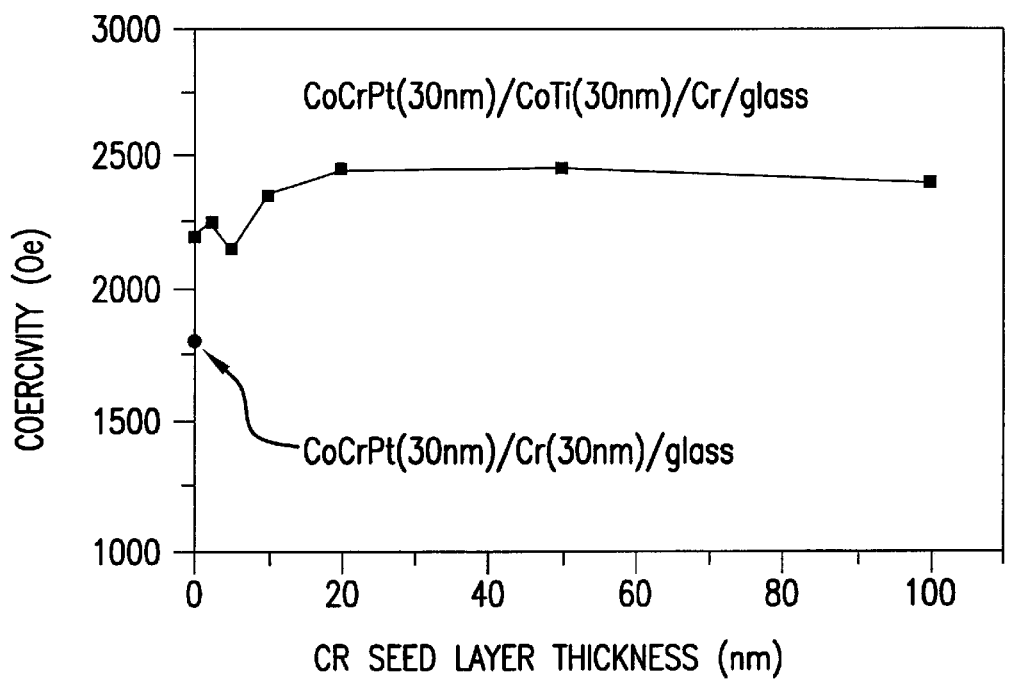
FIG. 4 is a graph showing the change of the magnetic property according to the thickness change of a Cr seed layer in CoCrPt(300 Å)/CoTi(300 Å)/Cr/glass thin film in which the Cr seed layer is introduced.
Figure 5:
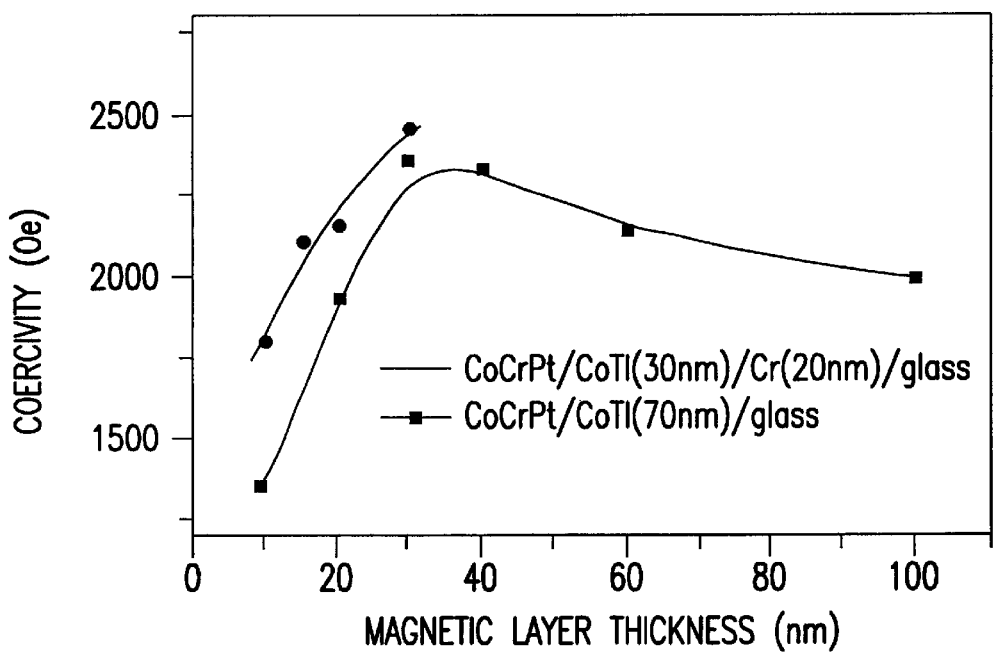
FIG. 5 is a graph showing a change of the magnetic property according to the thickness change of CoCrPt magnetic layer in CoCrPt/CoTi(300 Å)/Cr (200 Å)/glass thin film in which a Cr seed layer is introduced.

Further, the inventors investigated whether the introduction of a Cr seed layer to a CoTi underlayer can improve the magnetic property of thin film. FIG. 4 is a graph showing a change of the magnetic property according to the thickness change of the Cr seed layer in CoCrPt(300 Å)/CoTi(300 Å)/Cr/glass thin film in which a Cr seed layer is introduced. FIG. 5 is a graph showing a change of the magnetic property according to a thickness change of the CoCrPt magnetic layer in CoCrPt/CoTi(300 Å)/Cr(200 Å)/glass thin film in which a Cr seed layer is introduced.

From FIGS. 4 and 5, it can be noted that as a Cr seed layer is introduced to the CoTi underlayer, the thin film shows the coercity of about 2,500 Oe even in a thinner CoTi underlayer and the coercity of the thin film is increased about 250 Oe as much as that of the thin film using an underlayer without the seed layer. In addition, the thin film with a Cr seed layer shows good coercity even in a thin magnetic layer of 100 to 300 Å thickness.

Figure 6:
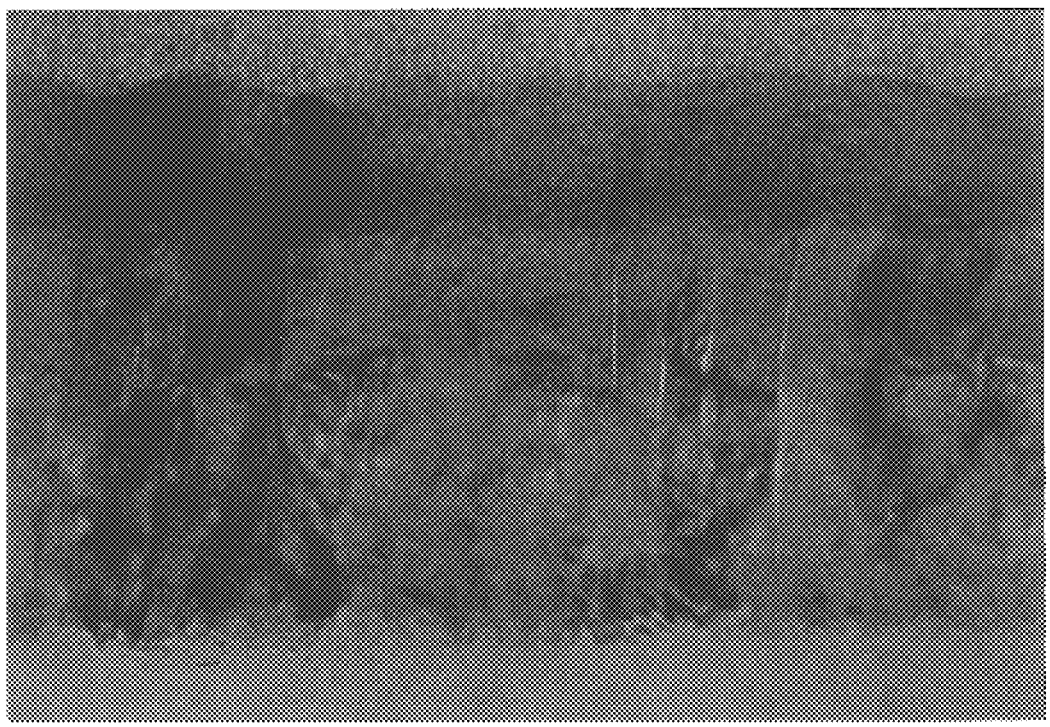
FIG. 6 is a cross sectional TEM bright field image of CoCrPt(300 Å)/CoTi(300 Å)/Cr(500 Å)/glass thin film in which a Cr seed layer is introduced.

Further, in case of the CoCrPt(300 Å)/CoTi(300 Å)/Cr (500 Å)/glass thin film in which a Cr seed layer is introduced, the CoTi thin film grows on the Cr seed layer as crystal from the initial growth and has as a columnar structure a superior grain-to-grain epitaxial relationship with the CoCrPt thin film (FIG. 6).

An underlayer thin film comprising AlPd or CoTi intermetallic compound, $Co_{50}Ti_{50-x}M_x$ metal alloy, or CoTi/Cr of a double thin film structure in which a Cr seed layer is introduced according to the invention is prepared by a conventional sputtering method or other gaseous phase deposition methods. More specifically, an underlayer with said composition and structure according to the invention for a high density magnetic recording media is prepared by alloy target and composite target mode or simultaneous sputtering method wherein the thin film is formed under conditions where the temperature of the substrate is room temperature or the substrate is heated up to a temperature of 200 to 300° C., or a substrate bias is applied or not applied.

DESCRIPTION OF THE PREFERRED EMBODIMENTS

The present invention will be illustrated in greater detail by way of the following examples. The examples are presented only for illustrative purposes and should not be construed as limiting the invention. Those skilled in the art can appreciate that the composition of the thin film and the method of the preparation can be changed or modified within the spirit and scope of the invention.

Example 1

Using a DC magnetron sputtering appliance (312H, Anelva Inc.), CoTi alloy target and Al target bonded with Pd chips were deposited as an underlayer thin film of 700 Å thickness on a glass substrate, respectively, while adjusting their composition to 50 atom % to 50 atom % in a mode of composite target, and then a CoCrPt magnetic thin film of 300 Å thickness was deposited thereon. When sputtering, the pressure of argon gas was 10 mTorr, and the temperature of the substrate was about 280° C.

As a comparative example, under the same deposition conditions, a Cr thin film underlayer with the same thickness was deposited on glass substrate, and then the magnetic thin film was deposited on the underlayer.

The magnetic properties of the thin films obtained by the above methods were investigated and shown below in Table 2. The magnetic properties were measured by a vibrating sample magnetometer (VSM, VSM-5 of Toei company).

Table 2. Magnetic properties of the thin films as prepared.

TABLE 2

Magnetic properties of the thin films as prepared.

| | Underlayer | Coercity (Oe) | Coercity Squareness | Squareness |
|---|---|---|---|---|
| Example of the invention | AlPd (without bias) | 1900 | 0.85 | 0.95 |
| Example of the invention | CoTi (without bias) | 2350 | 0.90 | 0.95 |
| Comparative example | Cr (without bias) | 1900 | 0.85 | 0.93 |

As shown in above Table 2, the AlPd and CoTi underlayers of the invention have higher coercity and coercity squareness than the Cr underlayer.

Example 2

In accordance to the procedures of Example 1, a CoTi underlayer thin film of the invention and a Cr underlayer thin film as a comparative example were deposited on a glass substrate of about 280° C., respectively, and then a CoCrPt magnetic thin film was deposited on the underlayers. Thereafter, their X-ray diffraction patterns were investigated, and the results are shown in FIG. 2. In addition, Transmission Electron Microscopy (TEM) photographs of the CoCrPt magnetic layer were taken, and shown in FIG. 3.

As shown in FIG. 2, in X-ray diffraction curves of CoCrPt/Cr/glass, the (0002) plane peak of the magnetic layer overlaps the (110) plane peak of the underlayer. In contrast with this, in X-ray diffraction curves of CoCrPt/CoTi/glass, the (0002) plane peak of the magnetic layer does not appear. Thus, it can be noted that the CoTi underlayer of the invention is suitable for a high density magnetic recording media.

As shown in FIG. 3, the grain size of the magnetic layer deposited on the CoTi underlayer of the present invention is about 200 Å, which is much finer than the grain size (about 400 Å) of the magnetic layer deposited on the Cr underlayer.

Example 3

In accordance to the procedures of Example 1, $Co_{50}Ti_{50-x}M_x$ alloy underlayer thin films, whose compositions are indicated in Table 3, were deposited on glass substrates of about 280° C., and then CoCrPt magnetic thin film was deposited on the underlayers. The magnetic properties of the obtained thin films were measured by VSM and the results were shown below in Table 3.

TABLE 3

Magnetic properties of the prepared thin films.

| | Underlayer | Coercity (Oe) | Coercity Squareness | Squareness |
|---|---|---|---|---|
| Example of the invention | $Co_{50}Ti_{48.5}Ag_{1.5}$ (without bias) | 2450 | 0.85 | 0.95 |
| Example of the invention | $Co_{50}Ti_{48.5}Cu_{1.5}$ (without bias) | 2400 | 0.85 | 0.92 |
| Example of the invention | $Co_{50}Ti_{48.5}Al_{1.5}$ (without bias) | 2450 | 0.85 | 0.93 |
| Example of the invention | $Co_{50}Ti_{48.5}Zr_{1.5}$ (without bias) | 2400 | 0.85 | 0.93 |
| Example of the invention | $Co_{50}Ti_{50}$ (without bias) | 2350 | 0.90 | 0.95 |
| Comparative example | Cr (without bias) | 1900 | 0.85 | 0.93 |

As known in Table 3, $Co_{50}Ti_{50-x}M_x$ alloy underlayer thin films like CoTi underlayer thin film show superior magnetic properties compared to Cr underlayer thin film.

Example 4

In accordance to the similar procedures of Example 1, a Cr seed layer of 200 Å thickness was coated on a glass substrate of about 280° C., and then a CoTi underlayer of 300 Å thickness was deposited on the seed layer. Thereafter, a CoCrPt magnetic thin film of 300 Å thickness was deposited on the underlayer. The magnetic properties of the obtained specimen were measured by VSM, and the results were shown below in Table 4.

TABLE 4

Magnetic properties of the CoTi/Cr underlayer.

| | Underlayer | Coercity (Oe) | Coercity Squareness | Squareness |
|---|---|---|---|---|
| Example of the invention | CoTi(300 Å) /Cr(200 Å) (without bias) | 2500 | 0.85 | 0.90 |
| Comparative example | CoTi(300 Å) (without bias) | 2250 | 0.89 | 0.90 |
| Comparative example | Cr(300 Å) (without bias) | 1800 | 0.83 | 0.90 |

As shown in Table 4, the specimen obtained by using a CoTi/Cr underlayer of edouble thin film structure according to the invention shows about 250 Oe coercity more than the specimen which was prepared by depositing a CoCrPt magnetic thin film of 300 Å thickness on the CoTi underlayer, and about 700 Oe coercity more than the specimen which was prepared by depositing a CoCrPt magnetic thin film of 300 Å thickness on a Cr underlayer of 300 Å thickness.

Thus, the CoTi/Cr underlayer of double thin film structure of the invention have the advantage in terms of uniform distribution of finer grain size and mass production since its oriented growth can be achieved while reducing the thickness of CoTi.

Example 5

In accordance to the procedures of Example 4, a Cr seed layer of 200 Å thickness was coated on a glass substrate of about 280° C., and then a CoTi underlayer of 300 Å thickness was deposited on the seed layer. Thereafter, CoCrPt magnetic thin films of varied thickness were deposited on the underlayer, and the magnetic properties of the obtained specimens were measured.

As the result, as shown in FIG. 5, it can be known that the thin film has a good coercity even if the thin magnetic layer of 100 to 300 Å thickness is used.

Example 6

In accordance to the similar procedures of Example 4, a Cr seed layer of 500 Å thickness was coated on glass substrate of about 280° C., and then a CoTi underlayer of 300 Å thickness was deposited on the seed layer. Thereafter, CoCrPt magnetic thin film of 300 Å thickness was deposited on the underlayer, and the crystal structure of the obtained specimen was investigated by TEM.

As the result, as shown in FIG. 6, it can be known that in case of CoCrPt(300 Å)/CoTi(300 Å)/Cr(500 Å)/glass thin film in which a Cr seed layer is introduced, CoTi thin film grows on the Cr seed layer as crystal from the time when the thin film was initially formed, and have as a columnar structure a superior grain-to-grain epitaxial relationship with CoCrPt thin film.

What is claimed is:

1. A high density magnetic recording medium comprising as an underlayer an alloy with B2 crystal structure having the formula:

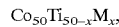

wherein

M is at least one element selected from the group consisting of Mg, Al, Si, Ca, V, Cr, Mo, Cu, Zn, Ge, Zr, Mn, Ag, Sn, W, Ta, Nb and Pt; and x is atom % with the range of $0 < x \leq 10$.

* * * * *